United States Patent
Yanai

(10) Patent No.: US 6,898,521 B2
(45) Date of Patent: May 24, 2005

(54) NAVIGATION DEVICE

(75) Inventor: Tatsumi Yanai, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 9 days.

(21) Appl. No.: 10/326,099

(22) Filed: Dec. 23, 2002

(65) Prior Publication Data
US 2004/0204847 A1 Oct. 14, 2004

(30) Foreign Application Priority Data

Feb. 14, 2002 (JP) ........................................ 2002-037133

(51) Int. Cl.⁷ .............................................. G01C 21/00
(52) U.S. Cl. ....................... 701/210; 701/200; 701/207; 701/209; 73/178 R; 340/988; 340/995.21
(58) Field of Search ................................. 701/210, 200, 701/207, 209; 73/178 R; 340/988, 995.21

(56) References Cited

U.S. PATENT DOCUMENTS

| 5,359,529 A | * | 10/1994 | Snider ......................... 701/210 |
| 5,508,931 A | * | 4/1996 | Snider ......................... 701/207 |
| 5,635,925 A | * | 6/1997 | Kishi et al. .................. 340/996 |
| 6,188,955 B1 | * | 2/2001 | Robinson et al. ........... 701/200 |
| 6,240,364 B1 | * | 5/2001 | Kerner et al. ............... 701/210 |
| 6,484,093 B1 | * | 11/2002 | Ito et al. ...................... 701/211 |
| 6,600,975 B2 | * | 7/2003 | Moriguchi et al. ............ 701/1 |
| 6,690,323 B1 | * | 2/2004 | Shebshaevich et al. 342/357.12 |
| 6,691,028 B2 | * | 2/2004 | Bullock et al. ............. 701/202 |
| 6,691,128 B2 | * | 2/2004 | Natesan et al. ............. 707/102 |
| 2001/0047240 A1 | * | 11/2001 | Lee ............................. 701/208 |
| 2002/0049533 A1 | * | 4/2002 | Kusano et al. .............. 701/209 |
| 2003/0018427 A1 | * | 1/2003 | Yokota et al. .............. 701/208 |
| 2003/0043045 A1 | * | 3/2003 | Yasushi et al. ............. 340/576 |
| 2003/0069686 A1 | * | 4/2003 | Watanabe et al. ........... 701/200 |
| 2003/0220736 A1 | * | 11/2003 | Kawasaki .................... 701/211 |
| 2004/0078139 A1 | * | 4/2004 | Kornhauser et al. ........ 701/210 |

FOREIGN PATENT DOCUMENTS

JP    2001-141478 A1    5/2001

* cited by examiner

Primary Examiner—William A. Cuchlinski, Jr.
Assistant Examiner—Olga Hernandez
(74) Attorney, Agent, or Firm—Shinjyu Global IP Counselors, LLP

(57) ABSTRACT

A navigation device is configured to provide a suitable route that appropriately guides a vehicle to a user outside the vehicle even when the user has moved. The navigation device detects a current vehicle position using a GPS signal receiving section that temporarily stores the vehicle position. The navigation device is configured to receive a signal containing position information from a portable telephone terminal. Then, the navigation device sets the stored position of the portable telephone terminal as the current destination, and calculates a recommended route to the destination. The navigation device communicates with the portable communication terminal to acquire updated position information. Then, the navigation device updates the destination based on the updated position information, and recalculates the recommended route from the current position to the updated destination.

23 Claims, 5 Drawing Sheets

| ID | ATTRIBUTE | LATITUDE | LONGITUDE |
|---|---|---|---|
| XX | ROAD SHOULDER PARKING AREA (A) | XX° XX' XX" | XX° XX' XX" |
| XX | ROAD SHOULDER PARKING AREA (B) | XX° XX' XX" | XX° XX' XX" |
| XX | _ OO STATION, WEST EXIT ROTARY | XX° XX' XX" | XX° XX' XX" |
| ... | ... | ... | ... |

Fig. 2

| ID | ATTRIBUTE | LATITUDE | LONGITUDE |
|---|---|---|---|
| XX | COFFEE SHOP (A) | XX° XX' XX" | XX° XX' XX" |
| XX | COFFEE SHOP (B) | XX° XX' XX" | XX° XX' XX" |
| XX | OO STATION, WEST EXIT ROTARY | XX° XX' XX" | XX° XX' XX" |
| ... | ... | ... | ... |

Fig. 3

NAVIGATION DEVICE

BACKGROUND OF THE INVENTION

1. Field of the Invention

The present invention relates to a navigation device and a route guiding method that provide the driver of a vehicle with information for guiding the vehicle to the position of a user who possesses a portable terminal.

2. Background Information

Currently, many vehicles are equipped with a navigation system to assist the driver in locating a destination. These systems use map data for guiding the driver of the vehicle along a route to a final destination point that is selected by the driver of the vehicle. It has also been disclosed in Japanese Laid-Open Patent Publication No. 2001-141478 to enable the driver of the vehicle to locate a user who is outside the vehicle by using a portable telephone terminal having a built-in position measuring device. Specifically, the navigation system includes a communication function that receives position information acquired from the portable telephone terminal and sets the received position as the destination for the vehicle.

As used hereinafter, the term "the user" refers to a person that is using a portable telephone terminal at a remote location from a vehicle equipped with a navigator device that communicates with the portable telephone terminal. The term "the driver" as used hereinafter refers to a person located in a vehicle equipped with a navigation device that communicates with a portable telephone terminal.

In view of the above, it will be apparent to those skilled in the art from this disclosure that there exists a need for an improved navigation device. This invention addresses this need in the art as well as other needs, which will become apparent to those skilled in the art from this disclosure.

SUMMARY OF THE INVENTION

It has been discovered that in the publication discussed above, the destination of the vehicle is not updated once it has been set based on the position information received from the portable telephone terminal held by the user. Consequently, the set destination will differ from the actual position of the user if the user moves after the destination is set.

Another problem is that, even if the user of the portable telephone terminal does not move, the location set as the destination is sometimes an inappropriated place for the driver to meet the user of the portable telephone terminal.

The present invention was proposed in view of these problems and its object is to provide a navigation device and method that can guide a vehicle along an appropriate route even if the user of the oprtable telephone terminal moves.

In order to achieve the aforementioned object, a navigation device is provided that includes a communication exchange section, a memory section, a vehicle position detecting section, a route calculating section, a communication control section and a recalculating section. The communication exchange section is configured to exchange signals with an external communication terminal. The memory section is configured to store position information of the external communication terminal contained in a signal received from the external communication terminal. The vehicle position detecting section is configured to detect a current position of a vehicle equipped with the navigation device. The route calculating section is configured to set a destination based on the position information of the external communication terminal stored in the memory section and calculates a recommended route for traveling from the current position detected by the vehicle position detecting section to a destination. The communication control section is configured to control communications between the communication exchange section and the external communication terminal that sent the position information and acquire an updated position information of the external communication terminal. The recalculating section is configured to reset the destination to an updated destination based on the updated position information of the external communication terminal that was acquired, and to recalculate the recommended route to travel from the current position recently detected to the updated destination.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2 is a suitable position determining table that is used by the navigation system of FIG. 1 for deciding on a meeting place that is suitable to the vehicle;

FIG. 3 is a suitable position determining table that is used by the navigation system of FIG. 1 for deciding on a meeting place that is suitable to the user, who is outside the vehicle;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
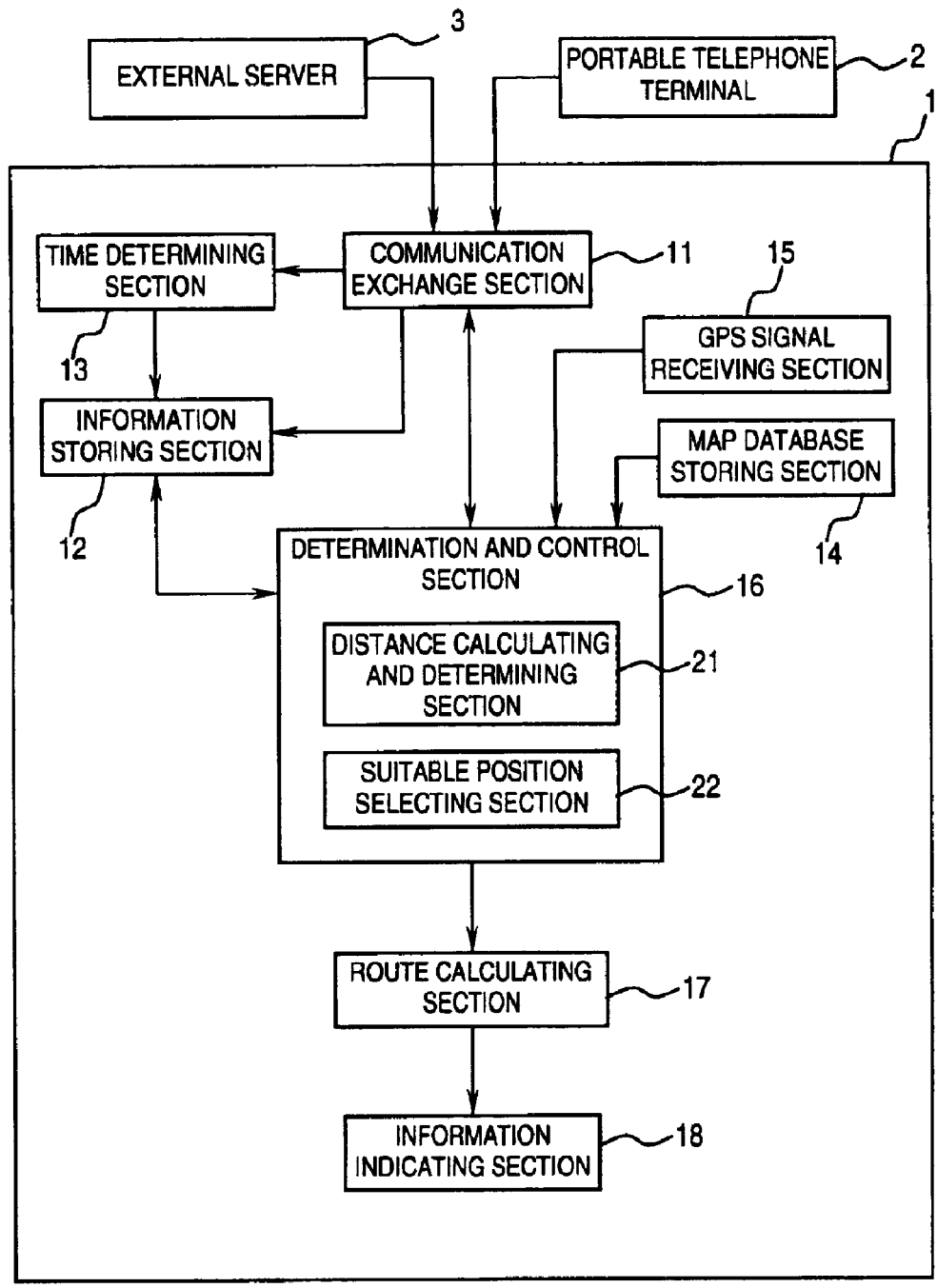
FIG. 1 is a block diagram showing the general system configuration of a navigation system in accordance with one embodiment of the present invention.

Referring initially to FIG. 1, a navigation system is schematically illustrated in accordance with a first embodiment of the present invention. This navigation system involves a wireless connection between a navigation device 1 installed in a vehicle and one or more portable telephone terminals 2, which are held by users remotely located from the vehicle. Optionally, the navigation device 1 communicates with an external server 3 using a wireless connection to download various information, e.g., updated maps, traffic information, weather conditions, etc. The wireless connections between the navigation device 1 and the telephone terminals 2 and/or the external server 3 are made through a telephone circuit network in a conventional manner.

Basically, the navigation device 1 is configured to provide a suitable route to a driver of a vehicle equipped with the navigation device 1 for appropriately guiding the driver of the vehicle to the portable telephone terminal 2 being used by the user even when the user has moved. More specifically, when the navigation device 1 detects that the vehicle is within a prescribed distance from the place or destination of the user as specified by the position information that was received from the portable telephone terminal 2, the navigation device 1 acquires an updated position information, resets the destination (i.e., the location of the user) based on the updated position information, and recalculates the recommended route to travel from the current vehicle position to the updated destination.

Preferably, the portable telephone terminal 2 has a telephone function for conducting telephone calls with other portable telephones, a telephone number transmission function for sending its telephone number information to the party being communicated with when it transmits a signal, and a position transmission function for sending a signal, with position information specified according to operations performed by the user. In this embodiment, the portable telephone terminal 2 uses its telephone function to access the navigation device 1 on the vehicle and uses its telephone number transmission function and position transmission function to send telephone number information and position information to the navigation device 1, respectively. Moreover, the telephone function of the portable telephone terminal 2 can be used by the user to verbally communicate commands to the navigation device 1 so as to provide information or instructions to the navigation device 1. Of course, the navigation device 1 is preferably provided with a hand set that permits the driver to communicate directly with the user such that during the conversation between the driver and the user, the navigation device 1 receives the telephone number information and the position information simultaneously.

Preferably, the navigation device 1 and the portable telephone terminal 2 are configured to communicate without making a voice telephone call. Thus, the navigation device 1 is updated automatically without any manual inputs from either the driver or the user. Of course, the navigation device 1 and the portable telephone terminal 2 are preferably further configured such that the user can communicate commands either verbally or by pushing keys (e.g., buttons or touch screen) directly to the navigation device 1 such that the user can at least partially control the final destination or stopping position.

As shown in the function block diagram of FIG. 1, the navigation device 1 basically comprises a communication exchange section 11, a position information storing section 12, a time determining section 13, a map database storing section 14, a GPS (global positioning system) signal receiving section 15, a determination and control section 16, a route calculating section 17, and an information indicating section 18. The determination and control section 16 controls the various sections making up the navigation device 1

In use, the navigation device 1 detects the current position of the vehicle in which it is installed by using the GPS signal receiving section 15 that temporarily stores the current vehicle position in the position information storing section 12. The communication exchange section 11 is configured to connect wirelessly with the portable telephone terminal 2 to receive a signal containing position information of the portable telephone terminal 2. The communication exchange section 11 can use any suitable communication method that will carry out the present invention. Then, the route calculating section 17 sets the stored position of the portable telephone terminal 2 as the current vehicle destination and calculates a current recommended route for traveling from the current position to the destination. At this time, the information indicating section 18 displays the recommended route and guides the driver along the route using conventional navigation techniques. When the navigation device 1 detects that the vehicle is within a prescribed distance from the previously stored destination specified by the position information that was received from the portable telephone terminal 2, the navigation device 1 communicates with the portable communication terminal 2 that sent the position information to acquire updated position information. Then the navigation device 1 resets or updates the destination based on the updated position information that was just acquired, and recalculates the recommended route to travel from the current position to the updated destination.

The communication exchange section 11 is equipped with the same communication protocol as the portable telephone terminal 2 and exchanges information with the portable telephone terminal 2 through a telephone circuit network. Thus, when the communication exchange section 11 receives an incoming communication or signal from the portable telephone terminal 2, the communication exchange section 11 not only accepts the incoming communication or signal, but also automatically receives the position information (hereinafter called "specified position information") and telephone number information from the portable telephone terminal 2. The communication exchange section 11 also sends an output signal to the time determining section 13 indicating that an incoming signal was received from the portable telephone terminal 2 and sends the specified position information to the information storing section 12. It will be apparent to those skilled in the art from this disclosure that the incoming signal from the portable telephone terminal 2 can be either initiated by the portable telephone terminal or in response to an output signal initiated by the communication exchange section 11.

The time determining section 13 comprises, for example, a timer and other items and sends incoming signal reception time information to the information storing section 12 in response to the information from the communication exchange section 11 indicating that an incoming signal was received.

The information storing section 12 sets or registers the telephone number information received by the communication exchange section 11 as IDs and stores the incoming signal reception time information and specified position information (comprising a latitude and a longitude) corresponding to each ID. The information storing section 12 stores a plurality of telephone numbers and stores incoming signal reception time information and specified position information for each telephone number. The determination and control section 16 registers telephone number information to the information storing section 12 and updates the incoming signal reception time information and specified position information already stored in the information storing section 12. For example, if an incoming signal is received again from the same portable telephone terminal 2, i.e., the portable telephone terminal having the same telephone number information (ID), the incoming signal reception time information and specified position information are updated.

The map database storing section 14 is a large-capacity storage mechanism that stores a database containing a plurality of map data comprising display-purpose maps that are displayed by the information indicating section 18. The map database storing section 14 also stores link information and node information used for route calculation. The map database storing section 14 is read by the determination and control section 16 and outputs the map data.

The GPS signal receiving section 15 is connected by wireless communications to a GPS satellite and receives a GPS signal. The GPS signal receiving section 15 creates information indicating the current position of the vehicle (hereinafter called "vehicle position information") using the received GPS signal and sends the created vehicle position information to the determination and control section 16.

The route calculating section 17 calculates a recommended route from the vehicle position to the destination in response to instructions from the determination and control section 16. The determination and control section 16 sets the destination for the route calculating section 17. The route calculating section 17 uses the specified position information, the vehicle position information, and the map data stored in the information storing section 12 to calculate a recommended route for traveling from the vehicle position to the destination. It then creates route information and outputs the route information to the information indicating section 18.

The information indicating section 18 serves to indicate various types of information to the vehicle driver. The information indicating section 18 comprises a display mechanism and a sound mechanism. The display mechanism of the information indicating section 18 displays maps and the like. The sound mechanism of the information indicating section 18 emits a route guidance voice and/or other sounds used for route guidance. The information indicating section 18 receives map data (which is stored in the map database storing section 14), the vehicle position information, and the destination information from the determination and control section 16. Then, the information indicating section 18 displays the vehicle position and destination on the map in such a manner that the driver can view the relationship between the two positions. The information indicating section 18 receives the route information from the route calculating section 17 and displays a recommended route connecting the vehicle position to the destination. Moreover, the information indicating section 18 provides route guidance in relation to the current position of the vehicle.

The determination and control section 16 controls the content indicated on the information indicating section 18 by controlling the aforementioned sections. The determination and control section 16 reads the specified position information stored in the information storing section 12 and sets it as the destination specified by the user. The determination and control section 16 sends destination information to the route calculating section 17 and executes control to make the route calculating section calculate a route from the vehicle position to the destination.

The determination and control section 16 is equipped with a distance calculating and determining section 21 and a suitable position selecting section 22 for setting a new destination from the destination specified by the user.

The distance calculating and determining section 21 receives vehicle position information input from the GPS signal receiving section 15 and reads the destination information set by the determination and control section 16. The distance calculating and determining section 21 calculates the distance from the vehicle position to the destination. The distance calculating and determining section 21 compares the distance between the vehicle position and the destination to a prescribed distance and then requests that the specified position be retransmitted when it determines that the vehicle position is in the vicinity of the destination.

The suitable position selecting section 22 selects a suitable destination when the specified position specified by the user is set to a new destination and instructs the communication exchange section 11 to transmit destination information indicating the selected destination to the portable telephone terminal 2. When this is done, the suitable position selecting section 22 reads the map data for the vicinity of the specified destination from the map database storing section 14 and selects from among the map data one or more suitable positions where the vehicle can stop and that can serve as a suitable destination. Then, the suitable position selecting section 22 sets a position where the vehicle can stop and that is close to the position specified by the user as the destination and transmits the destination to the portable telephone terminal 2.

Regarding selection of a suitable destination, the suitable position selecting section 22 can also be configured such that when there are not any detailed map data stored in the map database storing section 14, it instructs the communication exchange section 11 to acquire detailed map data from a server (not shown in the drawings) and sets the suitable destination by identifying a position where the vehicle can stop in the detailed map data. With this arrangement, a destination that allows the vehicle to stop and is close to the position specified by the user can be set without storing detailed map data in the map database storing section 14.

The suitable position selecting section 22 can also be configured such that it has suitable position determining tables like those shown in FIGS. 2 and 3 and refers to the suitable position determining tables to set a destination that is suitable for the vehicle or the user. Here, the suitable position selecting section 22 changes the suitable position determining table it uses as necessary and refers to one suitable position determining table or the other to set the suitable destination.

The suitable position determining table shown in FIG. 2 contains a plurality of data entries regarding destinations that are suitable meeting places for the vehicle and the suitable position determining table shown in FIG. 3 contains a plurality of data entries regarding destinations that is suitable meeting places for the user. The suitable position determining tables are arranged according to ID and include attribute information indicating an attribute of the meeting place and position information comprising the latitude and longitude of the position of the meeting place on the map.

Figure 4:
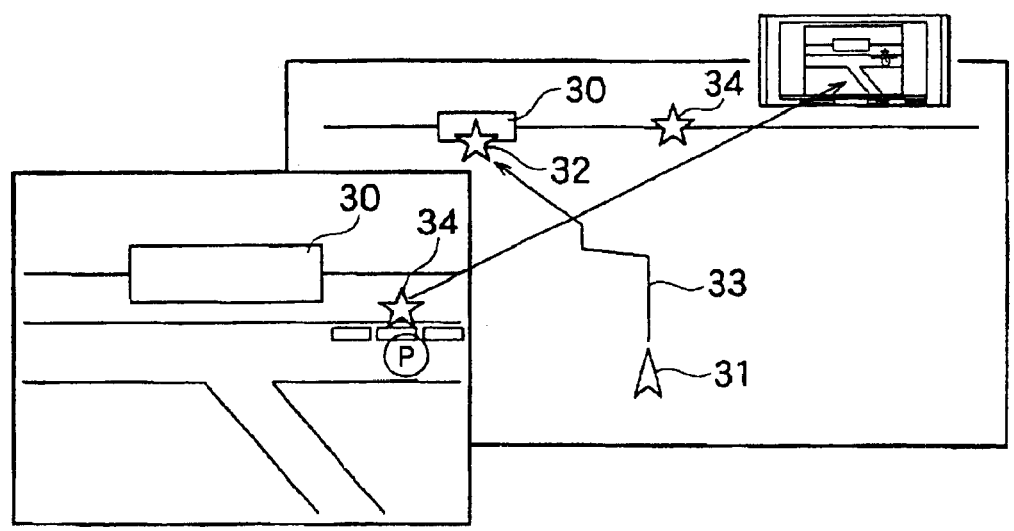
FIG. 4 is a diagram that illustrates how the meeting place is changed from the meeting place specified by the user to a stopping position where the vehicle can stop.

Referring now to FIG. 4, an example of finding a suitable stopping position using the navigation system of the present invention will be explained. The navigation system executes the above mentioned process using the determination and control section 16. First, a station position 30 is transmitted as the specified position from the portable telephone terminal 2 to the navigation device 1. Then, the determination and control section 16 initially sets the station position 30 as the destination. As a result, a recommended route from the current vehicle position to the station position 30 is calculated. The information indicating section 18 then displays a vehicle position 31, a destination position 32, and a recommended route 33. Next, the suitable position selecting section 22 refers to the suitable position determining tables, selects a suitable destination in the vicinity of the station position 30, sets the selected destination as the new destination, and transmits the new destination to the portable telephone terminal 2. If a road shoulder position 34 exists in the vicinity of the station position 30, as seen in FIG. 4, which allows the vehicle to stop, then the road shoulder position 34 is selected as the suitable stopping position. The processing steps executed by the determination and control section 16 in order to accomplish these tasks are described later.

The determination and control section 16 also manages the telephone number information stored in the information storing section 12. More specifically, the communication exchange section 11 accepts a signal from the portable telephone terminal 2 and receives the telephone number information, the determination and control section 16 determines if the received telephone number information is stored in the information storing section 12 and manages (registers) the telephone number information stored in the information storing section 12.

Figure 5:
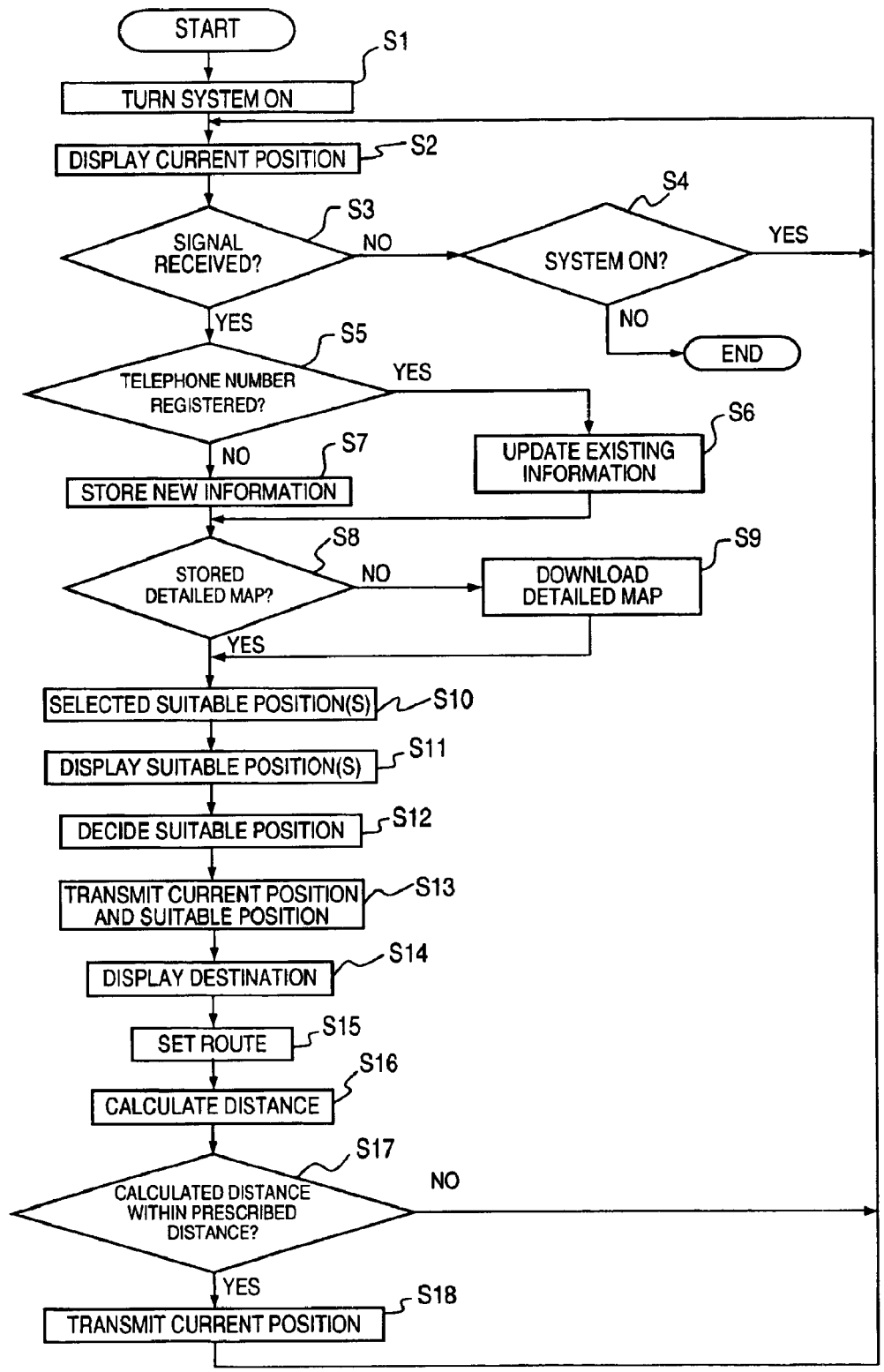
FIG. 5 is a flowchart showing a set of processing steps that is used by the navigation system of FIG. 1 in accordance with the present invention in order to establish a suitable route.

Now, the route setting processing executed by the determination and control section 16 of the navigation system will be described while referring to the flowchart shown in FIG. 5.

When it is started up by an operation performed by the driver, the navigation system turns ON (step S1) and the determination and control section 16 starts the processing of step S2 and later steps. First, the determination and control section 16 reads the map data containing the vehicle position from the map database storing section 14 using the vehicle position information acquired by the GPS signal receiving section 15 and displays a vehicle position on a map on the information indicating section 18 (step S2).

Next, the determination and control section 16 determines if the communication exchange section 11 has received an incoming signal from the portable telephone terminal 2 (step S3). If an incoming signal has not been received, the determination and control section 16 determines if the navigation system is ON (step S4). If the navigation system is not ON, the processing ends. If the navigation system is ON, the determination and control section 16 returns to step S2. Meanwhile, if an incoming signal reception did occur, the determination and control section 16 checks the telephone number information already stored in the information storing section 12 and determines if the telephone number information from the newly received incoming signal has already been registered in the information storing section 12 as an ID (step S5). If the telephone number information is registered in the information storing section 12, the determination and control section 16 updates the incoming signal reception time information and specified position information corresponding to the registered telephone number information (step S6). If the telephone number information is not registered in the information storing section 12, the telephone number information is newly registered as an ID and the incoming signal reception time information and specified position information corresponding to the registered telephone number information are stored (step S7).

Next, the determination and control section 16 determines if detailed map data for the vicinity of the specified position is stored in the map database storing section 14 (step S8). If the map data exists within the map database storing section 14, the determination and control section reads the detailed map data from the map database storing section 14 and proceeds to step S10. If the map data does not exists within the map database storing section 14, the determination and control section 16 instructs the communication exchange section 11 to download detailed map data from an external source (step S9) such as the external server 3. Instead of downloading from an external source, it is also acceptable for the detailed map data to be acquired from a vehicle-mounted recording medium or the like in which detailed map data has been stored in advance.

Next, the suitable position selecting section 22 of the determination and control section 16 compares the detailed map data stored in the map database storing section 14 or the detailed map data downloaded in step S9 with the suitable position determining table shown in FIG. 2 or FIG. 3. Then, the suitable position selecting section 22 of the determination and control section 16 selects a suitable position from among the detailed map data (step S10), and displays the suitable position on a detailed map (step S11). Here, if there are several suitable positions included in the detailed map, the suitable position selecting section 22 selects and displays all of the suitable positions. It is also acceptable for the suitable position selecting section 22 to display both positions that are suitable to the vehicle and positions that are suitable to the user or to display positions that are suitable to both the vehicle and the user. Furthermore, it is acceptable for the suitable position determining tables to be preset suitable position determining tables from which suitable positions are selected and displayed.

Next, when one or more suitable positions are displayed, the vehicle driver or the user issues an instruction so as to decide on one of the suitable positions (step S12). Then, the determination and control section 16 sets the position information indicating the selected suitable position as the new destination and instructs the communication exchange section 11 to send the new destination and the vehicle position information to the portable telephone terminal 2 (step S13). As a result, the user is informed of the newly set meeting place.

Next, the determination and control section 16 instructs the information indicating section 18 to display the selected suitable position decided upon in step S12. Thus, the information indicating section 18 indicates to the driver the detailed map data and the new destination (step S14). Then the determination and control section 16 instructs the route calculating section 17 to set a recommended route for the vehicle to arrive at the new destination (step S15). As a result, the information indicating section 18 displays detailed map data, the new destination, and a recommended route for the vehicle to arrive at the new destination.

Next, the distance calculating and determining section 21 of the determination and control section 16 calculates the distance along the recommended route from the vehicle position to the new destination decided upon in step S12 (step S16) and then determines if the calculated distance along the recommended route is within a preset (prescribed) distance (step S17). In step S17, it is also acceptable to calculate an estimated arrival time when the vehicle will arrive at the destination based on the distance along the recommended route calculated by the distance calculating and determining section 21 and on traffic information for the recommended route acquired from the external server 3 or the like and to send the calculated arrival time to the portable telephone terminal 2. This would inform the user of the time when the vehicle will arrive and allow the meeting to be accomplished even more reliably.

When the calculated distance along the recommended route is determined to be within the prescribed distance, the determination and control section 16 determines that it is time to retransmit the vehicle position and instructs the communication exchange section 11 to transmit vehicle position information newly acquired by the GPS signal receiving section 15 (step S18), thus informing the user of the current position of the vehicle. In addition to transmitting the vehicle position, the determination and control section 16 also transmits information requesting position information to be transmitted so that it can reacquire the specified position information. As a result, in the steps following the next execution of step S2, the specified position information transmitted from the portable telephone terminal 2 in response to the request is updated and recorded the position information storing section 12. Meanwhile, if the distance along the recommended route is determined not to be within the prescribed distance, then the determination and control section determines that it is not time for the vehicle position to be retransmitted and returns to step S2.

Consequently, the determination and control section 16 has a function for storing the position specified by the portable telephone terminal 2 in the position information storing section 12 and can reset the specified position as the destination and recalculate the recommended route. Thus, the vehicle can be guided to the meeting place even if the user moves.

This navigation system can use detailed map data to reset the destination to a new position where the vehicle can stop. Thus, a meeting place that is suitable to the vehicle can be established.

Furthermore, this navigation system can refer to the suitable position determining tables of FIG. 2 and FIG. 3 and reset the destination to a suitable position based on the detailed map data. Thus, a meeting place that is suitable to both the vehicle and the user can be established. Also, the new destination set by referring to the suitable position determining table can be transmitted to the portable telephone terminal 2 to allow the driver and user to meet with certainty.

Alternate Route Setting Processing

Figure 6:
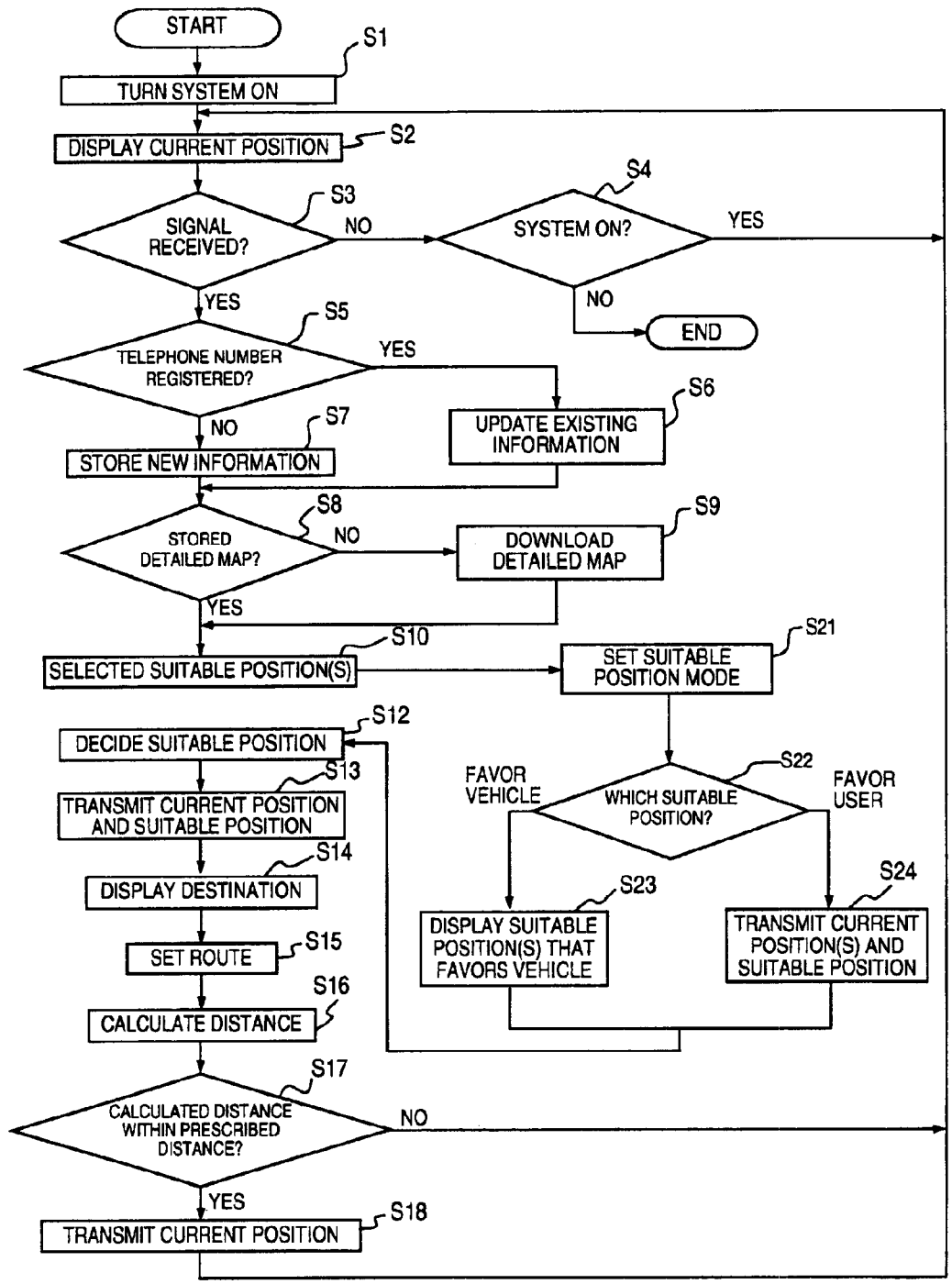
FIG. 6 is a flowchart showing an alternate set of processing steps that is used by the navigation system of FIG. 1 in accordance with the present invention in order to establish a suitable route.

Referring now to FIG. 6, a route setting processing in accordance with another embodiment will now be explained. In view of the similarity between the prior route setting processing and this alternate route setting processing, the steps that are identical to steps of the previously described route setting processing are indicated with identical step numbers and their detailed explanations are omitted.

After steps S1 to S10 have been executed, steps S21 to S24 are executed instead of simply displaying the suitable position in step S11 of the first embodiment of FIG. 1. These steps involve referring to the suitable position determining tables of either FIG. 2 or FIG. 3 in accordance with an instruction issued by the driver or the user and then displaying the suitable position based on the instructions issued by the driver or the user.

First, in step S21, the determination and control section 16 sets a suitable position mode to be used when displaying the suitable position in accordance with, for example, an instruction issued by the driver or the user. The determination and control section 16 then determines which of the suitable position modes was selected. Next, the determination and control section 16 determines if the suitable position selected using the suitable position determining table of FIG. 2 will be displayed or if the suitable position selected using the suitable position determining table of FIG. 3 will be displayed (step S22). If it is determined that a suitable position determining table that favors the vehicle will be used, only suitable positions selected using the suitable position determining table of FIG. 2 are displayed (step S23) for the driver and/or the user to select (step S12). Meanwhile, if it is determined that a suitable position determining table that favors the user will be used, only suitable positions selected using the suitable position determining table of FIG. 3 are displayed (step S24) for the driver or the user to select (step S12).

With this kind of processing, when a plurality of suitable positions have been determined by comparing the suitable position determining tables of FIG. 2 and FIG. 3 and the detailed map data, the driver or the user can select one or the other suitable position modes. Once one of the suitable position modes have been selected, a place or stopping position can be specified by the driver or the user as the final meeting place after the vehicle has gotten close to the meeting place specified by the user.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-037133. The entire disclosure of Japanese Patent Application No. 2002-037133 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A navigation device comprising:
   a communication exchange section configured to exchange signals with an external communication terminal;
   a memory section configured to store position information of the external communication terminal contained in a signal received from the external communication terminal, the signal including the location of the external communication terminal;
   a vehicle position detecting section configured to detect a current position of a vehicle equipped with the navigation device;
   a route calculating section configured to set a destination based on the position information of the external communication terminal stored in the memory section and calculates a recommended route for traveling from the current position detected by the vehicle position detecting section to the destination corresponding to the stored location of the external communication terminal; and a communication control section configured to control communications between the communication exchange section and the external communication terminal that sent the position information, and to acquire an updated position information of the external communication terminal; and a recalculating section configured to reset the destination to an updated destination based on the updated position information of the external communication terminal that was acquired, and to recalculate the recommended route to travel from the current position recently detected to the updated destination.

2. The navigation device as recited in claim 1, wherein the recalculating section is configured to acquire detailed map data of an area surrounding the updated destination specified by the updated position information, and to reset the updated destination using the map data that was recently acquired.

3. The navigation device as recited in claim 2, wherein the recalculating section is configured to use the map data to search for a stopping position where the vehicle can stop, and to reset the destination from the updated destination to the stopping position.

4. A navigation device comprising:

a communication exchange section configured to exchange signals with an external communication terminal;

a memory section configured to store position information contained in a signal received from the external communication terminal, the signal including the location of the external communication terminal;

a vehicle position detecting section configured to detect a current position of a vehicle equipped with the navigation device;

a route calculating section configured to set a destination based on the position information stored in the memory section and calculates a recommended route for traveling from the current position detected by the vehicle position detecting section to the destination corresponding to the stored location of the external communication terminal;

a communication control section configured to control communications between the communication exchange section and the external communication terminal that sent the position information, and to acquire an updated position information when it detects that the vehicle is within a prescribed distance from the destination specified by the position information stored in the memory section; and a recalculating section configured to reset the destination to an updated destination based on the updated position information that was acquired, and to recalculate the recommended route to travel from the current position recently detected to the updated destination, the recalculating section being further configured to acquire detailed map data of an area surrounding the updated destination specified by the updated position information, and to reset the updated destination using the map data that was recently acquired, the recalculating section being further configured to use the map data to search for a stopping position where the vehicle can stop, and to reset the destination from the updated destination to the stopping position, the recalculating section being further configured to select a suitable position for the vehicle to meet with a person possessing the external communication terminal, and to set the suitable position as a new destination.

5. The navigation device as recited in claim 4, wherein the communication control section is configured to acquire traffic information regarding the calculated route, to calculate an estimated arrival time of the vehicle at the destination using the traffic information, and to send the estimated arrival time to the external communication terminal.

6. The navigation device as recited in claim 3, wherein the communication control section is configured to acquire traffic information regarding the calculated route, to calculate an estimated arrival time of the vehicle at the destination using the traffic information, and to send the estimated arrival time to the external communication terminal.

7. The navigation device as recited in claim 2, wherein the communication control section is configured to acquire traffic information regarding the calculated route, to calculate an estimated arrival time of the vehicle at the destination using the traffic information, and to send the estimated arrival time to the external communication terminal.

8. A navigation device comprising:

a communication exchange section configured to exchange signals with an external communication terminal;

a memory section configured to store position information contained in a signal received from the external communication terminal, the signal including the location of the external communication terminal;

a vehicle position detecting section configured to detect a current position of a vehicle equipped with the navigation device;

a route calculating section configured to set a destination based on the position information stored in the memory section and calculates a recommended route for traveling from the current position detected by the vehicle position detecting section to the destination corresponding to the stored location of the external communication terminal;

a communication control section configured to control communications between the communication exchange section and the external communication terminal that sent the position information, and to acquire an updated position information when it detects that the vehicle is within a prescribed distance from the destination specified by the position information stored in the memory section; and a recalculating section configured to reset the destination to an updated destination based on the updated position information that was acquired, and to recalculate the recommended route to travel from the current position recently detected to the updated destination, the recalculating section being further configured to acquire detailed map data of an area surrounding the updated destination specified by the updated position information, and to reset the updated destination using the map data that was recently acquired, the recalculating section being configured to select a suitable position for the vehicle to meet with a person possessing the external communication terminal, and to set the suitable position as a new destination.

9. The navigation device as recited in claim 1, wherein the communication control section is configured to acquire traffic information regarding the calculated route, to calculate an estimated arrival time of the vehicle at the destination using the traffic information, and to send the estimated arrival time to the external communication terminal.

10. A navigation device comprising:
communication exchange means for exchanging signals with an external communication terminal;
memory means for storing position information of the external communication terminal contained in a signal received from the external communication terminal, the signal including the location of the external communication terminal;
vehicle position detecting means for detecting the current position of a vehicle equipped with the navigation device;
route calculating means for setting a destination based on the position information of the external communication terminal stored in the memory means and calculating a recommended route for traveling from the current position detected by the vehicle position detecting means to the destination, corresponding to the stored location of the external communication terminal;
communication control means for controlling communications between the communication exchange means and the external communication terminal that sent the position information and acquiring the updated position information of the external communication terminal; and
recalculating means for resetting the destination to an updated destination based on the updated position information of the external communication terminal that was acquired and recalculating the recommended route to travel from the current position recently detected to the updated destination.

11. A route guiding method, comprising:
detecting a current position of a vehicle that is being guided along a route;
setting a destination based on position information of an external communication terminal contained in a signal received from the external communication terminal, the signal including the location of the external communication terminal;
calculating a recommended route for traveling from the current position to the destination, the destination corresponding to the stored location of the external communication terminal;
acquiring an updated position information of the external communication terminal by communicating with the external communication terminal that sent the position information;
resetting the destination to an updated destination based on the updated position information of the external communication terminal that was acquired; and
recalculating the recommended route to travel from the current position recently detected to the updated destination.

12. The route guiding method as recited in claim 11, further comprising
acquiring a detailed map data of an area surrounding the position specified in the updated position information, and resetting the destination using the map data, after the recommended route has been recalculated.

13. The route guiding method as recited in claim 12, further comprising
indicating a stopping position where the vehicle can stop using the map data and the position that is set as the destination, after the recommended route has been recalculated.

14. A route guiding method comprising:
detecting a current position of a vehicle that is being guided along a route;
setting a destination based on position information contained in a signal received from an external communication terminal, the signal including the location of the external communication terminal;
calculating a recommended route for traveling from the current position to the destination, the destination corresponding to the stored location of the external communication terminal;
acquiring an updated position information by communicating with the external communication terminal that sent the position information upon detecting that the vehicle is within a prescribed distance from the destination specified in the position information that was received from the external communication terminal and stored;
resetting the destination to an updated destination based on the updated position information that was acquired;
recalculating the recommended route to travel from the current position recently detected to the updated destination;
acquiring a detailed map data of an area surrounding the position specified in the updated position information, and resetting the destination using the map data, after the recommended route has been recalculated;
indicating a stopping position where the vehicle can stop using the map data and the position that is set as the destination, after the recommended route has been recalculated; and
selecting a suitable position for the vehicle to meet a person possessing the external communication terminal and setting the suitable position as a new destination after the recommended route has been recalculated.

15. The route guiding method as recited in claim 14, further comprising
acquiring traffic information regarding the calculated route, calculating an estimated arrival time of the vehicle at the destination using the acquired traffic information, and sending the estimated arrival time to the external communication terminal.

16. The route guiding method as recited in claim 13, further comprising
acquiring traffic information regarding the calculated route, calculating an estimated arrival time of the vehicle at the destination using the acquired traffic information, and sending the estimated arrival time to the external communication terminal.

17. The route guiding method as recited in claim 12, further comprising
acquiring traffic information regarding the calculated route, calculating an estimated arrival time of the vehicle at the destination using the acquired traffic information, and sending the estimated arrival time to the external communication terminal.

18. A route guiding method comprising:
detecting a current position of a vehicle that is being guided along a route;
setting a destination based on position information contained in a signal received from an external communication terminal, the signal including the location of the external communication terminal;
calculating a recommended route for traveling from the current position to the destination, the destination corresponding to the stored location of the external communication terminal;

acquiring an updated position information by communicating with the external communication terminal that sent the position information when it is detected that the vehicle is within a prescribed distance from the destination specified in the position information that was received from the external communication terminal and stored;

resetting the destination to an updated destination based on the updated position information that was acquired;

recalculating the recommended route to travel from the current position recently detected to the updated destination;

acquiring a detailed map data of an area surrounding the position specified in the updated position information, and resetting the destination using the map data, after the recommended route has been recalculated; and selecting a suitable position for the vehicle to meet a person possessing the external communication terminal and setting the suitable position as a new destination after the recommended route has been recalculated.

19. The route guiding method as recited in claim 11, further comprising acquiring traffic information regarding the calculated route, calculating an estimated arrival time of the vehicle at the destination using the acquired traffic information, and sending the estimated arrival time to the external communication terminal.

20. The navigation device as recited in claim 1, wherein the communication control section is configured to acquire the updated position information of the external communication terminal when it detects that the vehicle is within a prescribed distance from the destination specified by the position information stored in the memory section.

21. The navigation device as recited in claim 9, wherein the communication control section is configured to acquire the updated position information of the external communication terminal when the estimated arrival time approaches.

22. The route guiding method as recited in claim 11, wherein acquiring the updated position information when it is detected that the vehicle is within a prescribed distance from the destination specified in the position information that was received from the external communication terminal and stored.

23. The route guiding method as recited in claim 19, wherein acquiring the updated position information when the estimated arrival time approaches.

* * * * *